(12) United States Patent
Wiik et al.

(10) Patent No.: US 10,131,312 B2
(45) Date of Patent: Nov. 20, 2018

(54) CENTER SIDE AIRBAG MODULE

(71) Applicant: TK Holdings Inc., Auburn Hills, MI (US)

(72) Inventors: Richard Andrew Wiik, Oakland, MI (US); Russell Joseph Mihm, Beverly Hills, MI (US)

(73) Assignee: Joyson Safety Systems Acquisition LLC, Auburn Hills, MI (US)

( * ) Notice: Subject to any disclaimer, the term of this patent is extended or adjusted under 35 U.S.C. 154(b) by 0 days.

(21) Appl. No.: 15/434,837

(22) Filed: Feb. 16, 2017

(65) Prior Publication Data
US 2017/0232922 A1    Aug. 17, 2017

Related U.S. Application Data

(60) Provisional application No. 62/295,820, filed on Feb. 16, 2016.

(51) Int. Cl.
*B60R 21/231* (2011.01)
*B60R 21/2338* (2011.01)
(Continued)

(52) U.S. Cl.
CPC ...... *B60R 21/23138* (2013.01); *B60R 21/237* (2013.01); *B60R 21/2338* (2013.01);
(Continued)

(58) Field of Classification Search
CPC ............ B60R 21/23138; B60R 21/237; B60R 21/2338; B60R 2021/23386;
(Continued)

(56) References Cited

U.S. PATENT DOCUMENTS 7,798,580 B2 * 9/2010 Goldberg ............... A47B 21/00
312/108
8,282,126 B2  10/2012 Wiik et al.
(Continued)

FOREIGN PATENT DOCUMENTS

| KR | 10 2011 0047559 A | 5/2011 |
| KR | 10-1090832 B1 | 12/2011 |
| WO | WO 2012/118324 A2 | 9/2012 |

OTHER PUBLICATIONS

International Search Report and Written Opinion dated May 19, 2017 issued in PCT/US2017/018093.

*Primary Examiner* — Darlene P Condra
(74) *Attorney, Agent, or Firm* — Gordon Rees Scully Mansukhani, LLP

(57) ABSTRACT

An airbag module for protecting an occupant of a vehicle seat includes an inflatable cushion and an inflator for providing inflation gas. The module is mounted on an inboard side of a second vehicle seat located adjacent to the vehicle seat containing the occupant. The cushion is configured to inflate into a position between the seats and includes a forward inflatable chamber that is a larger volume than a rearward inflatable chamber. The forward chamber extends vertically from the bottom of the vehicle seat to a position suitable to receive impact from the head of the occupant in the event of a far-side crash event. The rearward inflatable chamber is configured to deploy into a position inboard of the vehicle seats. The forward and rearward inflatable chambers are separated by a cleft that opens toward the occupant.

20 Claims, 14 Drawing Sheets

(51) Int. Cl.
   *B60R 21/237* (2006.01)
   *B60R 21/00* (2006.01)
(52) U.S. Cl.
   CPC .............. *B60R 2021/0006* (2013.01); *B60R 2021/0048* (2013.01); *B60R 2021/23146* (2013.01); *B60R 2021/23386* (2013.01)
(58) Field of Classification Search
   CPC .. B60R 2021/23146; B60R 2021/0048; B60R 2021/0006
   See application file for complete search history.

(56) References Cited

U.S. PATENT DOCUMENTS

| | | |
|---|---|---|
| 9,415,739 B2 | 8/2016 | Mihm et al. |
| 9,566,882 B2 | 2/2017 | Mihm et al. |
| 2005/0104342 A1* | 5/2005 | Jackson ............ B60R 21/23138 280/730.2 |
| 2007/0228701 A1 | 10/2007 | Yamamura |
| 2011/0309603 A1* | 12/2011 | Choi ..................... B60R 21/231 280/729 |
| 2012/0091697 A1 | 4/2012 | Wiik et al. |
| 2013/0076014 A1 | 3/2013 | Thomas et al. |
| 2014/0151984 A1* | 6/2014 | Fukawatase .......... B60R 21/233 280/730.2 |
| 2015/0197209 A1* | 7/2015 | Fujiwara ............... B60R 21/231 280/730.1 |
| 2015/0298639 A1 | 10/2015 | Mihm et al. |
| 2015/0321638 A1* | 11/2015 | Sugimoto ......... B60R 21/23138 280/729 |
| 2016/0144818 A1* | 5/2016 | Mihm ................... B60R 21/231 280/730.2 |
| 2016/0167616 A1 | 6/2016 | Wiik et al. |
| 2016/0200278 A1* | 7/2016 | Wiik ................. B60R 21/23138 280/729 |
| 2016/0229369 A1* | 8/2016 | Thomas ................ B60R 21/207 |
| 2016/0264091 A1* | 9/2016 | Fujiwara ............. B60R 21/2346 |
| 2016/0332592 A1 | 11/2016 | Mihm et al. |
| 2017/0158158 A1* | 6/2017 | Thomas ................ B60R 21/231 |
| 2017/0158160 A1* | 6/2017 | Sugimori ............. B60R 21/207 |
| 2017/0334386 A1* | 11/2017 | Park ................... B60R 21/2338 |

\* cited by examiner

CENTER SIDE AIRBAG MODULE

CROSS REFERENCE TO RELATED APPLICATION

The present application claims priority to and the benefit of U.S. Provisional Patent Application No. 62/295,820 filed on Feb. 16, 2016. The foregoing provisional application is incorporated by reference herein in its entirety.

GENERAL DESCRIPTION

The present application relates generally to airbag modules for vehicles. In particular, the application relates to a Center Side Impact Airbag (CSIAB) which is mounted in the center of the vehicle between left and right vehicle seats to protect an occupant from a side impact. In particular, the CSIAB offers protection to the occupant from a far-side crash event. The term "far-side" refers to the opposite side of the vehicle from the location of the occupant's seat.

Certain CSIAB employ a cushion that includes silicone sealed inflated fabric cushion and external tethering configured to reduce occupant cross-car travel in the event of a far-side crash. Certain CSIAB configurations also are configured to utilize interaction between the console and the inflated cushion. This interaction may be created by configuring the lower portion of the inflated cushion tube to inflate to a pre-determined dimension into a position that abuts or contacts the vehicle center console and wedges between the vehicle console and occupant to reduce occupant's cross-car travel. In general, more interaction between the console and the cushion yields less occupant cross-car travel and therefore better restraint performance. The vehicle console also provides restraint during an event, as the occupant may engage the console with the torso, hips, and legs as the occupant travels across the vehicle.

Many small vehicles have a very narrow cross-car gap between the driver and passenger seats and, thus, no room for a tall center console. As a result, there is little room to configure a center side impact airbag cushion that includes an inflatable chamber that can pinch or wedge against a console and provide supplemental restraint. Even if there is a center console present in a smaller vehicle, the console is generally structurally weak due to its small size and, as a result, may flex or bow when engaged by the occupant or cushion. Many small vehicles have no console against which the occupant or cushion may engage. As a result, small vehicles produce the most extreme load case for an inflated cushion that is configured to limit excursion of an occupant.

In vehicles where there is no console located between the occupants or the vehicle only includes a small and/or weak console, the current CSIABs that are mounted to the inboard side of the driver seat are not capable of restraining the occupant due to the induced forces that arise from an occupant traveling cross-car during a far-side crash event. One generally unacceptable option in small vehicles would be to increase the pressure in the cushion in order to provide more restraint for the occupant. The high pressure in the cushion may be supplied by a large sized, high pressure and high molar output inflator. However, the use of such a large size inflator increases module weight and package size beyond what is allowable in a seat trim environment. Furthermore, conventional cushion materials are not rated to handle the extreme high pressure (operating pressure of 300 kPa and up for extended period of time). Cushion material may be reinforced by additional heat shielding and extra layers of reinforcement material at high stress areas. However, such reinforcement would increase module weight, packageability, and cost. Thus, changing the cushion material configuration is not an acceptable commercial option. In most CSIABs, the use of silicone sealant to bond the fabric panels together is required to reach and maintain high pressure for restraint performance. Increasing the pressure in the cushion may require changes in the amount and/or type of sealant being used, which directly affects weight, packageability, and cost as well. Thus, there is need for a CSIAB module design for smaller vehicles which incorporates a conventionally sized inflator.

BRIEF DESCRIPTION OF THE DRAWINGS

Features, aspects, and advantages of the present invention will become apparent from the following description, appended claims, and the accompanying exemplary embodiments shown in the drawings, which are briefly described below.

DETAILED DESCRIPTION

Figure 1:
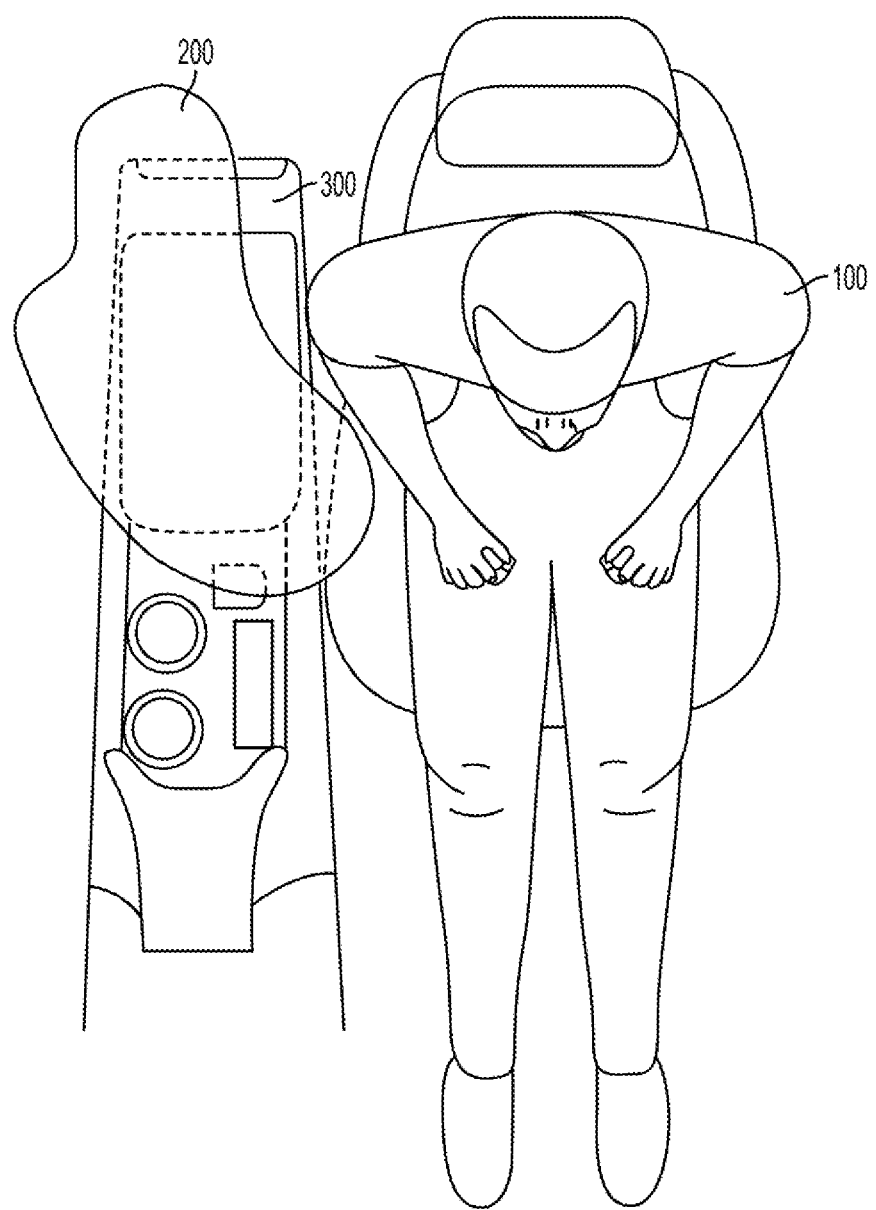
FIG. 1 is a top view of a deployed airbag according to a disclosed embodiment.

Various features and embodiments of a CSIAB will be described with reference to the drawings. Like numbers may be used throughout the drawings to refer to the same or similar parts and in each of the embodiments of hereafter described.

An embodiment of a CSIAB module disclosed herein is mounted to the inboard side of the seat frame 165, preferably to the passenger seatback side rail. The module includes an inflator 250 and an airbag or cushion 200. The cushion used in the module may include a sealant (e.g., silicone sealant) to maintain required pressure for performance. The cushion 200 is preferably configured with no exhaust vent openings. Inflation gas is not required to be exhausted during deployment, because the cushion 200 must retain pressure for both cushioning and lateral restraint. The cushion 200 is configured to deploy in a cross-car direction from the inboard of the passenger seat 151 toward the driver side to actively engage the driver seat occupant 100 and gradually absorb energy (i.e., "ride-down") as the occupant 100 travels across the vehicle towards either the intrusion or an adjacent passenger seat occupant 150. The deployment trajectory of the cushion 200 is configured to avoid the driver's shoulder while unfolding. The cushion 200 does not interfere with the passenger, because the cushion 200 deploys away from the passenger 150 towards the center of the vehicle and the driver 100.

The cushion 200 may include a forward inflatable chamber 205 and a rearward inflatable chamber 215. The forward inflatable chamber 205 may be configured to have a generally cylindrical shape. The cylindrical geometry of the forward inflatable chamber 205 of the cushion is provided so that the cushion has a sufficient section modulus to resist buckling once engaged with the driver occupant 100 and the passenger seat bottom 155. The section modulus is a measure of the strength of the inflated cushion and its resistance to bending. The size of the cushion 200 may vary depending on the severity of the vehicle crash pulse being considered during the design process.

Figure 20:
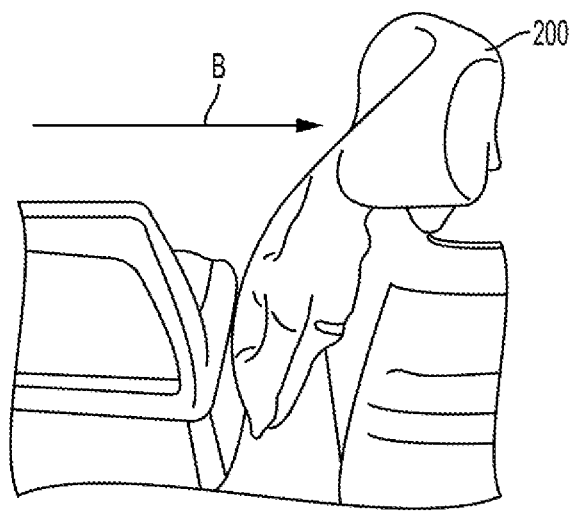
FIG. 20 is a rear view looking forward of a deployed airbag showing the direction of movement and translation of the driver.
Figures 21, 22:
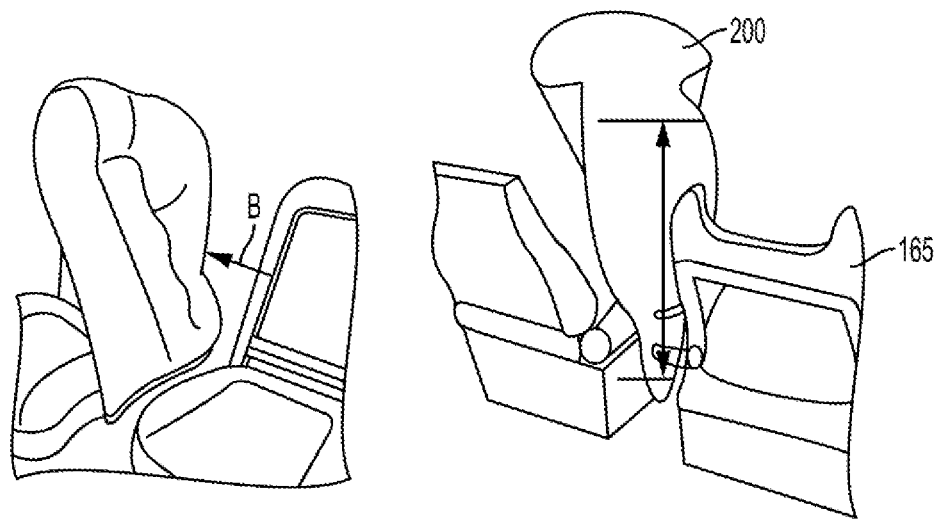
FIG. 21 is a front view looking rearward of a deployed airbag showing the direction of movement and translation of the driver.
FIG. 22 is a rear view looking forward of a deployed airbag showing the height of the airbag and the coverage of the seat frame.

The generally cylindrical forward portion of the cushion 205 is configured to be positioned vertically when deployed in the vehicle in order to increase the effectiveness of the cushion section modulus. This column like portion of the cushion 205 must bend (or resist bending) across the large diameter as occupant 100 engages the cushion 200. For example, as shown in FIGS. 20 and 21, as the driver moves in the direction B toward the cushion 200, the cushion resists bending as the forward inflatable chamber 205 extends vertically between the vehicle seats.

Figure 2:
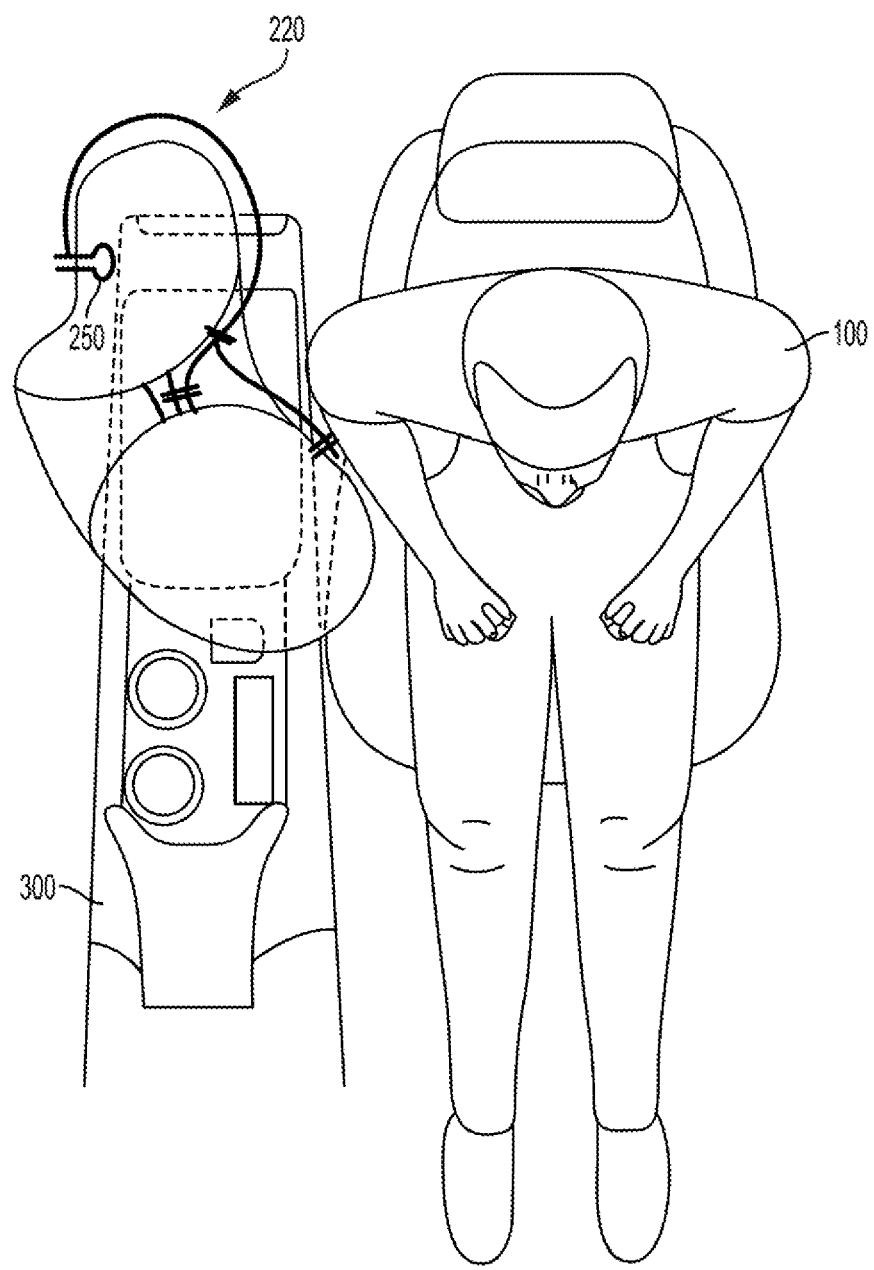
FIG. 2 is a top view of the airbag of FIG. 1 including optional tethers located to control the deployment and position of the airbag.

A lower portion of the cylindrical portion of the cushion is designed to push up against the passenger seat bottom 155 when loaded by the driver occupant 100 in order to use the seat bottom 155 as an interaction surface—in a manner similar to other CSIAB cushion designs engage a center console 300, as described above. The center console 300 is shown in FIGS. 1 and 2, but the CSIAB embodiments described herein are primarily intended to be used in seat configurations not having a center console or having only a small or structurally weak console between a pair of adjacent vehicles seats. The lower portion of the forward inflatable chamber 205 extends downwardly to further increase the effectiveness of the column-like structure of the chamber 205 and the overall cushion geometry. In a crash scenario, this lower portion will pinch or wedge between the driver and passenger seats and increase internal pressure through the reduction in effective cushion volume, therefore increasing the rigidity of the cushion and improving restraint.

The upper portion of the cushion includes both the generally cylindrical column portion and a rearward portion that together form a concave shape that may have a wedge or cleft type inflated profile to engage the seat foam/trim when subject to cross-car forces and compression. The cleft 275 in the cushion (as can be best seen from a top view of the cushion, FIG. 4, for example) opens toward the driver 100 and further increases the cushion's rigidity and restraint ability. The cleft 275 in the cushion 200 may be formed by connecting adjacent side panels of the cushion together. For example, zero tethers 260 (e.g., seams, sealant, bonding, gluing) may be used to connect the boundary panels of the cushion 200 to form the wedge or cleft shape. The cushion may have an angled profile cross-car (similar to a cupped hand) in order to actively harness the driver occupant torso during the absorption of energy during the occupant's ride-down of the cushion in a crash event. The forward inflatable chamber 205 may include zero depth tethers or uninflated sealed portions.

The cushion 200 is configured to provide head cushioning for the protected occupant against either an intrusion into the passenger compartment or an adjacent occupant. In particular, the cushion 200 is designed with a sufficient cross-car dimension so as to create a pillow-like wall protecting both the driver occupant 100 and passenger occupant 150 from contacting one another. In certain embodiments, where the cross-sectional modulus and internal pressure is not required to be large for sufficient restraint/head cushioning, the cushion may remain unsealed at the seams and a standard inflator may be employed. The elimination or reduction of sealant material (e.g., silicone) greatly reduces cost and improves packageability, even for a large cushion (if required). If a larger cross-sectional modulus is required for sufficient restraint, the cushion 200 may be sealed at one or a plurality of seam locations to prevent gas leakage in order to retain pressure more effectively using a standard inflator. Thus, a larger inflator may not be needed if the cushion is sealed. The cushion may or may not be externally tethered depending on vehicle environment demands for trajectory, restraint, etc.

The airbag module disclosed herein is configured for a vehicle without a center console or having only a small or structurally weak center console. The module may be mounted to the seat frame 165 at the passenger seat 151 inboard side seatback rail and deploying cross-car towards the driver occupant 100 as to create a rigid, cylindrical barrier between driver 100 and passenger 150 or between the driver and an intrusion. The deployed cushion may interact with the passenger seat bottom 155 and/or passenger seat occupant 150.

Figure 3:
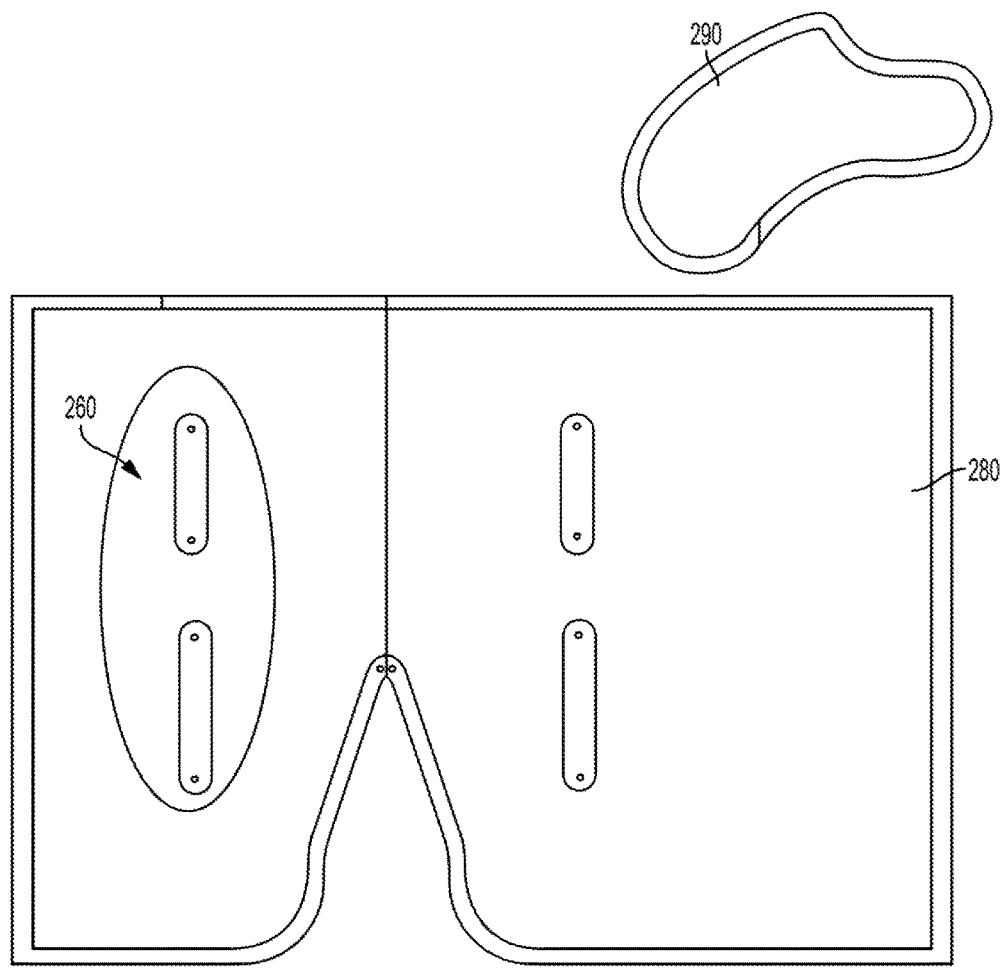
FIG. 3 is viewing of the various fabric panels that may be used to form the airbag embodiment shown in FIG. 1.

FIGS. 1-11, disclose the embodiment of the airbag module described above. As shown in the drawings, the cushion 200 includes two portions 205, 215. The more forward portion 205 has a generally cylindrical shape and together with the rearward portion 215 may form a wedge or cleft for engaging the driver, as shown in FIG. 1. As shown in FIG. 2, the airbag or cushion 200 may include an external tether 220 that wraps around the driver side of the cushion 200 for positioning the airbag in position. The cylindrical geometry of the forward cushion tube 205 will have sufficient section modulus to resist buckling when loaded from the side. The cushion 200 is generally unsealed. FIG. 3 shows the main fabric panels used to form the airbag. The primary panels for fabricating airbag 200 are shown. The main panel 280 is folded along a fold line and sewn along its perimeter, except for a top edge. The wedge shaped top panel 290 is connected to the open perimeter of the top of the main panel 280. The top panel 290 contains the wedge shape for engaging the driver. In an alternative embodiment, a one or three piece airbag may be used. The zero tether connections 260 between the side panel portions of the main panel 280 are shown in FIG. 3. These connections may include reinforcement fabric strips, as shown. The various reinforcing panel and tether panels are used to form the tether shown in FIG. 2. The asymmetrical side panel portions of the main panel 280 are configured to further enable the cleft or wedge shape of the overall cushion 200 that receives the driver.

Figure 4:
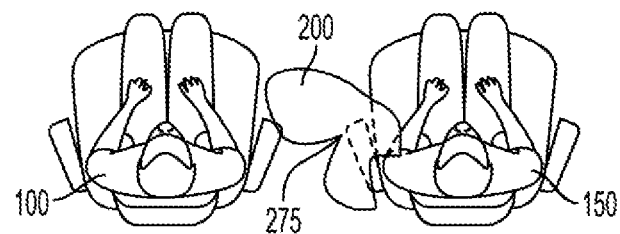
FIG. 4 is a top view of the deployed airbag of FIG. 1.
Figure 5:
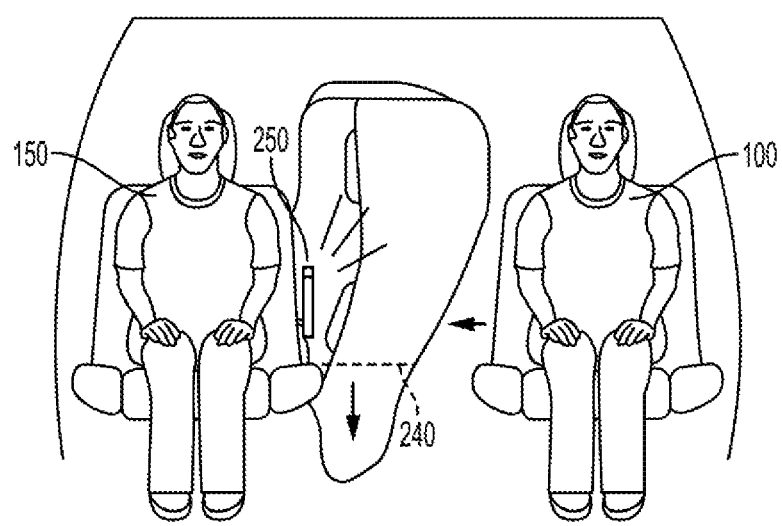
FIG. 5 is a front view looking rearward of the deployed airbag of FIG. 1.
Figure 7:
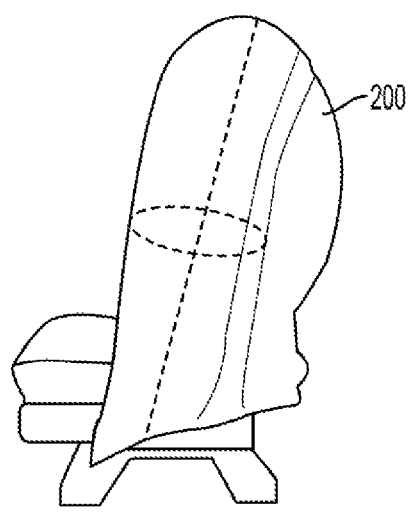
FIG. 7 is a side view of the deployed airbag of FIG. 1.
Figure 8:
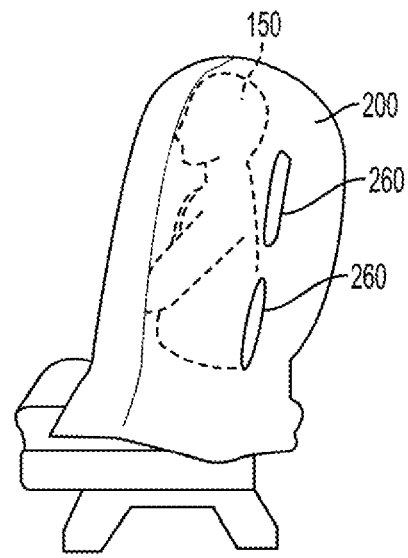
FIG. 8 is a side view from driver seat of deployed airbag of FIG. 1.
Figure 9:
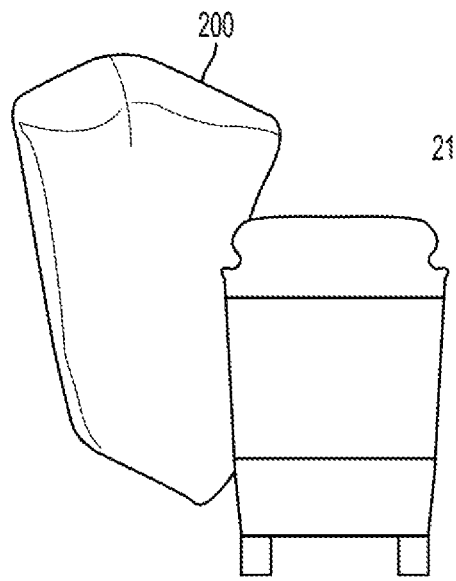
FIG. 9 is a rear view looking forward of the deployed airbag of FIG. 1.
Figure 10:
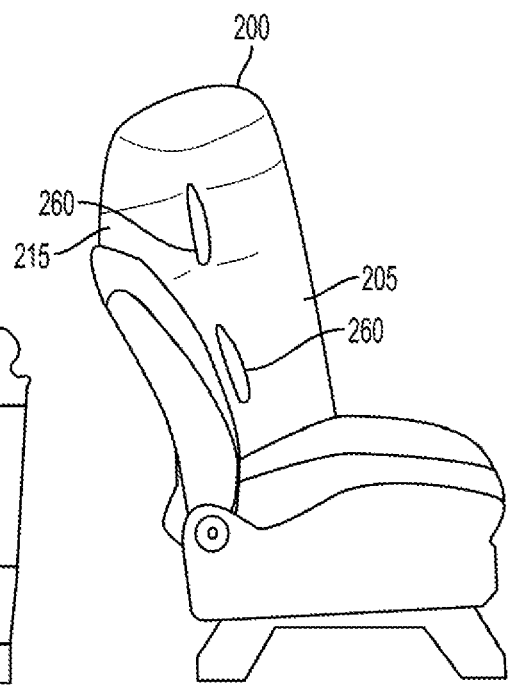
FIG. 10 is a side view from outboard the passenger seat of deployed airbag of FIG. 1.
Figure 11:
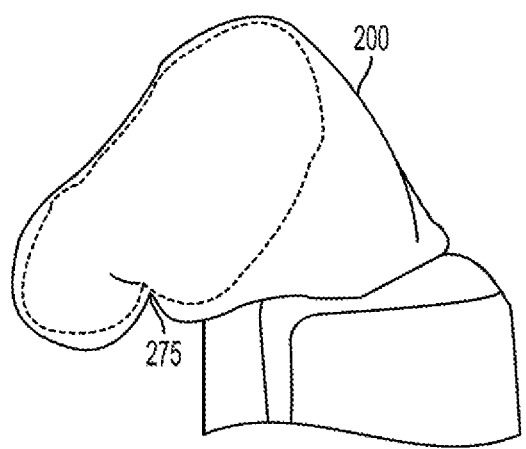
FIG. 11 is a top view of the deployed airbag of FIG. 1.

As shown in FIGS. 4 and 8, the driver occupant 100 is nested inside of the cushion profile, protecting the torso and head. The upper portion of the cushion has a cross-car profile that wraps around the driver occupant, and also wedges against the passenger occupant or passenger seat foam and trim. As shown in FIG. 5, after a far-side impact, the driver will travel towards the passenger occupant. The passenger seat mounted airbag 200 will deploy in position between the occupants and seat bases to provide a restraining "wall". The forward portion of the cushion extends low enough for interaction with the passenger and driver seat bottoms. For example, as shown in FIG. 5, the lower portion of the cushion 200 deploys below the seat bottoms. The upper portion of the cushion contains high loft for protecting the head of the driver, as shown in FIG. 8. As shown in FIGS. 5 and 7, the lower portion of the cushion is designed to extend past the top of the seat bottom in order to engage the seat bottom. The lower portion of the cushion may be wedged between the driver and passenger seat bottoms. FIGS. 9-11 show various other views of the deployed airbag of FIG. 1.

Figure 6:
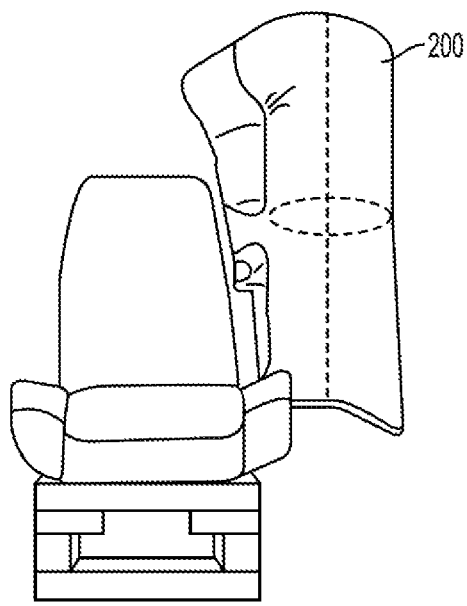
FIG. 6 is a front view looking rearward of the deployed airbag of FIG. 1.

As shown in FIGS. 6-8, the size of the airbag cushion and the cylindrical geometry of the forward portion of the cushion, for example a forward cushion tube 205, provides a sufficient section modules to resist buckling when loaded from the side by an occupant (e.g., the driver). The size of the cushion may also be large enough to ensure that the driver is nested within the profile of the cushion thereby protecting the torso and head of the driver. The cushion 200 is designed to provide total driver and passenger occupant coverage both upon and during a crash event. The head, shoulder, torso, hips, and thighs are completely protected.

An alternative embodiment of a far-side airbag module is shown in FIGS. 12-15. The module includes an inflator 450 and a cushion 400. The cushion 400 may include a forward inflatable chamber 405 and a rearward inflatable chamber 415. The large volume and loft of the forward chamber 405 provide a pillow-like wall between occupants and/or an intrusion into the passenger compartment of the vehicle. The cylindrical shape of the column portion 405 of the airbag 400 aids in opposing the lateral forces exerted on the cushion by the occupant. The forward column portion 405 of the airbag 400 may include small circular shaped silicone sealed portions 410 to reduce volume and maintain good operating pressure with a standard side airbag inflator size/output.

Figures 12, 13:
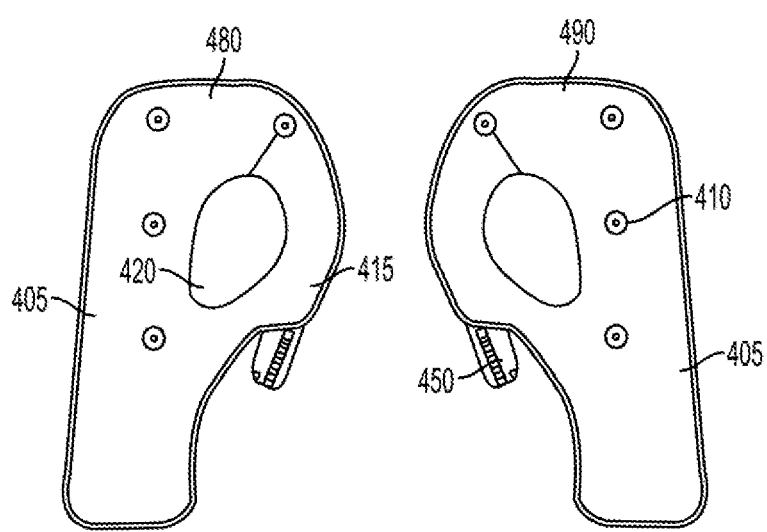
FIG. 12 is a driver side view of an uninflated airbag cushion according to an alternative embodiment.
FIG. 13 is a passenger side view of an uninflated airbag cushion according to the alternative embodiment shown in FIG. 12.
Figure 14:
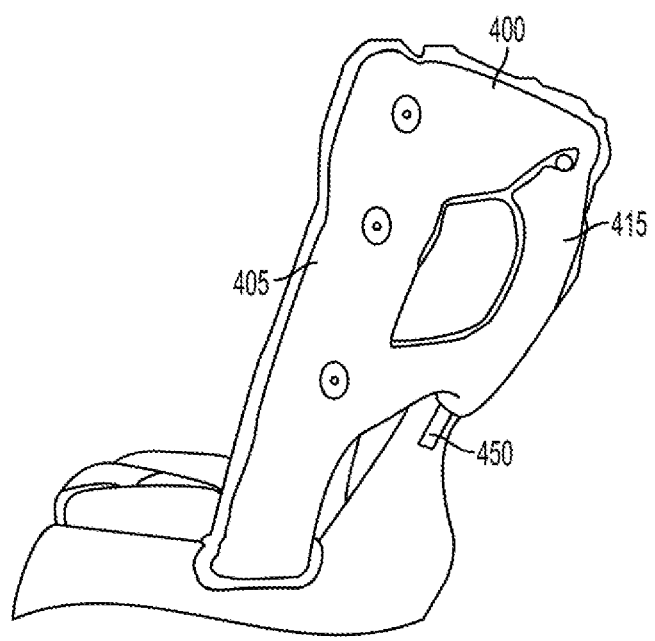
FIG. 14 is a side view from driver seat of the deployed airbag of FIG. 12.
Figure 15:
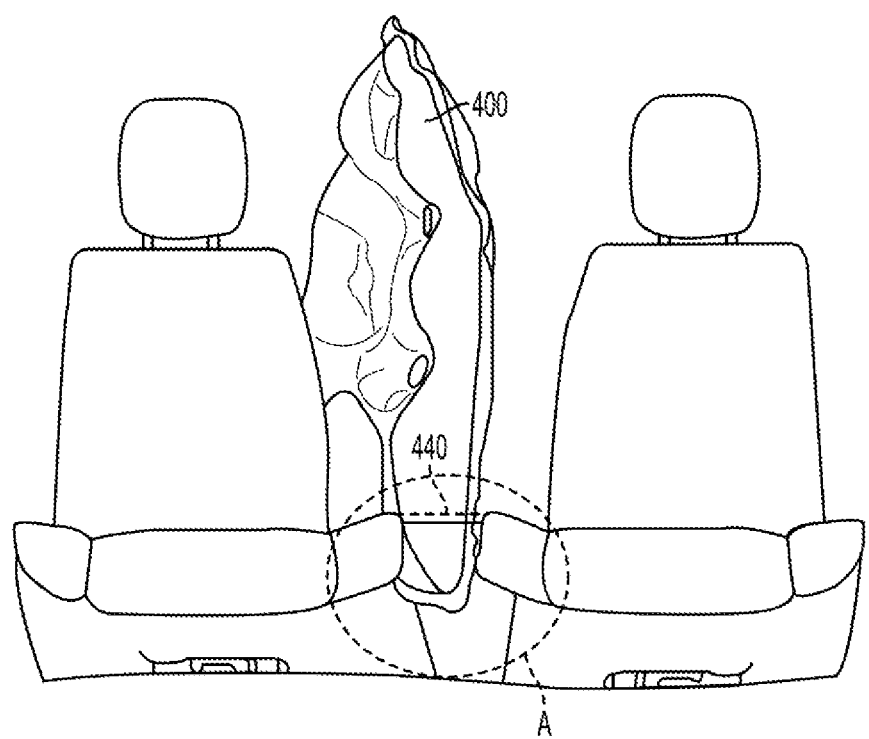
FIG. 15 is a front view looking rearward of the deployed airbag of FIG. 12.

The lower portion of the cushion 400 is designed to extend lower than the top of the seat bottom in order to engage the seat bottom 155 much like a center console in current designs. In vehicles without a center console, this type of interaction may be necessary for lateral restraint. The lower portion may wedge between the passenger and driver side seat bottoms The sealed portions or uninflated regions are positioned to reduce volume and maintain good operating pressure of the airbag while, at the same time, using a standard size inflator providing standard amount of gas output. As shown in FIGS. 12 and 13, the cushion 400 may include an uninflated region 420 between the forward and rearward inflatable chambers 405, 415. The cylindrical shape of the forward portion of the cushion aids in opposing lateral forces on the cushion by the occupants. The inflator 450 and airbag 400 are mounted to the seat back side rail, as shown in FIG. 14. As shown in FIG. 15 (see region "A"), the lower portion of the cushion 400 is designed to extend past the top of the seat bottom (see line 440) in order to engage the seat bottom. The lower portion of the cushion may be wedged between the driver and passenger seat bottoms. FIGS. 12 and 13 show the airbag laid flat with the inflator prior to installation and inflation. As shown, the airbag 400 may be formed from two panels 480, 490.

Figure 16:
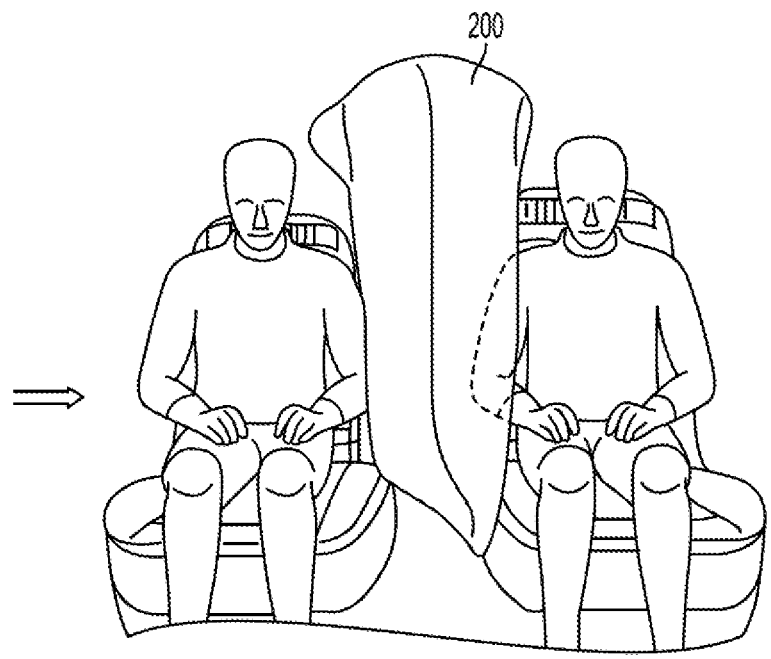
FIG. 16 is a front view looking rearward of the bottom portion of a deployed airbag showing the interaction between the seat bottoms and the airbag.
Figure 17:
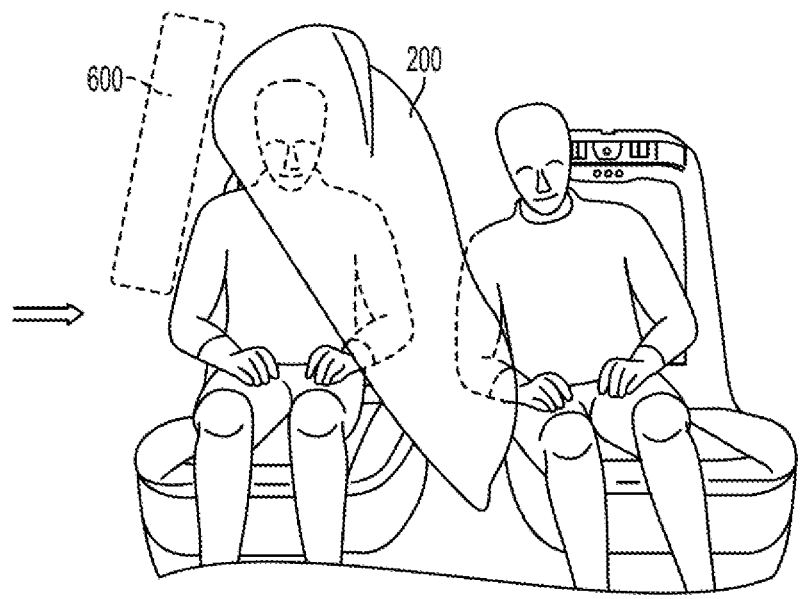
FIG. 17 is a front view looking rearward of a deployed airbag showing the airbag as positioned when in contact with the driver.

FIGS. 16-22 apply equally to both embodiments described above. Both embodiments described above are configured to function as described and shown with regard to FIGS. 16-22. As shown in FIG. 16, after a far-side impact, the driver 100 will travel towards the passenger occupant 150. The passenger seat mounted airbag will deploy in position between the occupants and seat bases to provide a restraining "wall". As shown in FIG. 17, as the driver occupant begins to engage the cushion, the driver may tilt due to the belt pretensioner and the head will be cushioned by the large diameter cushion profile thereby protecting the driver 100 from striking either the passengers head, the passenger seat 151, or any incoming vehicle intrusion. The passenger occupant 150 will be protected from the incoming driver occupant in between a roof rail (e.g., a side curtain) airbag 600 and the seat mounted airbag 200, 400. In the case shown, the passenger occupant 150 also serves as a means of restraint, acting as an additional counter-force to the driver.

Figure 18:
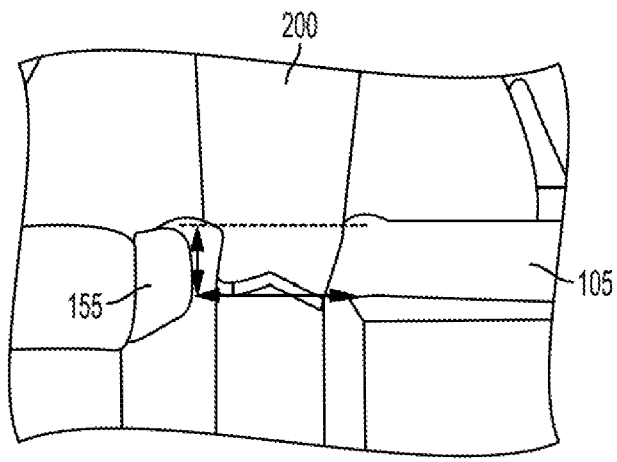
FIG. 18 is a front view looking rearward of a deployed airbag showing the interaction between the airbag and the seat bottoms.
Figure 19:
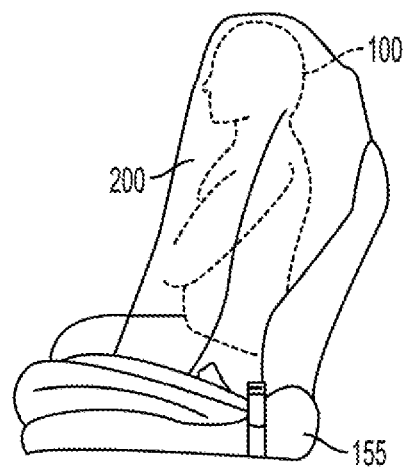
FIG. 19 is a side view of a deployed airbag looking inward from outboard the passenger's seat.

As shown in FIG. 18, the cushion may have interaction with both seat bottoms almost down to the floor of the vehicle. In a far-side crash with no console, the seats will come together and pinch the large chamber in between, further increasing the pressure of the cushion and improving restraint and cushioning. The interaction between the cushion and the seats can be tuned or designed for a specific vehicle environment. The cushion is designed to provide total driver and passenger occupant coverage both upon and during a crash event. The head, shoulder, torso, hips, and thighs are completely protected. (See FIG. 19, for example).

As shown in FIGS. 20-22, the driver moves in direction labeled B. As the cushion is pushed towards the passenger, the upper profile of the cushion is configured protect the driver from impacting the passenger seat frame (See FIG. 22). In addition, the cushion can rotate and engage the seat foam and trim to increase restraint. The cushion provides full passenger seat frame coverage to use as additional interaction for restraint as well as protection for the incoming driver occupant from the rigid seat frame.

Figure 23:
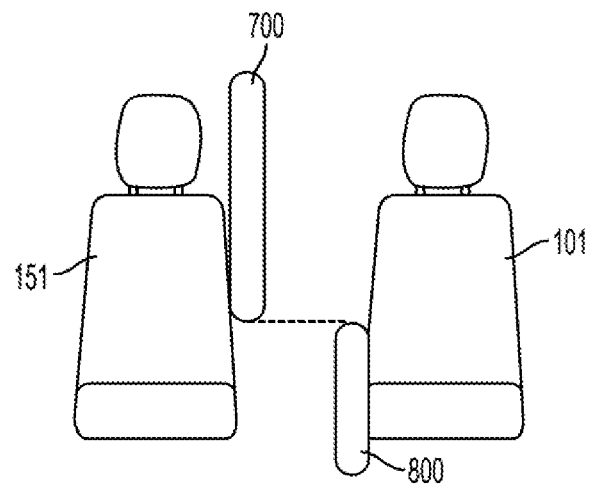
FIG. 23 is a front view looking rearward of another alternative embodiment of a center side impact airbag system including two airbags.
Figure 24:
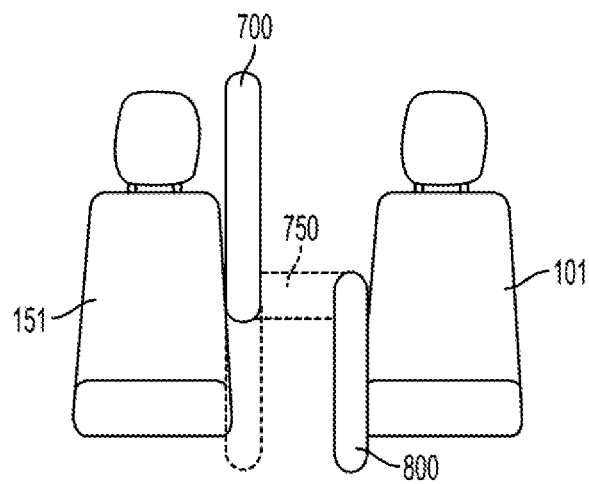
FIG. 24 is a front view looking rearward of two alternative embodiments of a center side impact airbag system including two airbags.

FIGS. 23 and 24 show alternative embodiments for far-side impact protection in vehicles not including a center console. For example, as shown in FIG. 23, the vehicle may include a passenger seat airbag 700 that deploys between the seats and a seat bottom mounted bag 800 that deploys from the driver seat bottom. The passenger seat bag is reduced size and doesn't engage the seat bottom bag. The passenger seat cushion may be of the form shown and described above with regarding FIG. 12-14. The cushion 400 may be modified to the appropriate dimensions to match the system shown in FIGS. 23-25.

Figure 25:
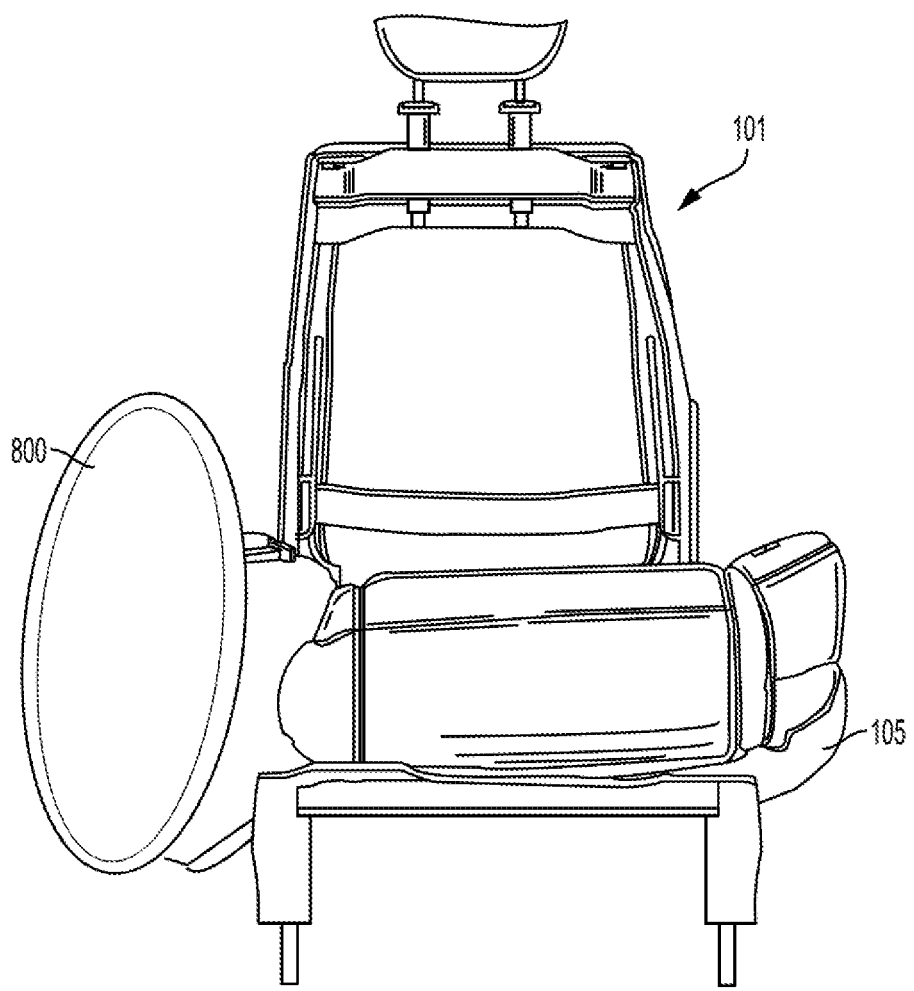
FIG. 25 is a front view looking rearward of an exemplary embodiment of the seat bottom mounted airbag shown in FIGS. 23 and 24.

An exemplary driver side seat mounted airbag or cushion is shown in FIG. 25. The driver side mounted airbag module includes an airbag or cushion 800 and an inflator. The cushion 800 is configured to deploy from the side bolster of the seat bottom 105 to a position between the driver seat 101 and occupant 100 and the center of the vehicle and another seat in the same row (e.g., the passenger seat). The cushion 800 interacts with the seat bottom frame to provide supplemental restraint in vehicle environments where no console is present. The cushion 800 may generally be formed from a first panel (e.g., inboard panel, inner panel, front panel, etc.) and a second panel (e.g., outboard panel, outer panel, rear panel, etc.) that are coupled together by a plurality of sewn seams. The airbag 800 may be divided into two or more compartments (e.g., chambers, tubes, etc.). Passages or ports may be provided between individual compartments such that the compartments are in fluid communication with each other. The airbag 800 may also include a plurality of un-inflated portions such as un-inflated portions that generally separate the compartments.

The cushion or airbag 800 may be provided to function with an elongated positioning mechanism such as, for example, straps or tethers. The tethers may be internal or external. The tethers may be provided to control the deployment of the airbag 800, for example to pre-position the airbag 800 to an upright position during inflation. After inflation, the tethers function to add strength and rigidity to the airbag 22.

In an inflated state, the airbag 800 forms a stiff, rigid, upright cushion that is disposed along the seat bottom 105. The upper portion of the airbag 800 may be positioned proximate to the hips and legs of the occupant 100, covering the thigh, knees, and hip joint of occupant 100.

Alternatively, as shown in FIG. 24, the passenger and driver airbags may be arranged to provide for interaction between the airbags. For example, the passenger bag and driver bag may "overlap" for some vertical distance 750 above the seat bottom. Or, as shown in dashed lines in FIG. 24, the passenger bag 700 may extend fully between the seat bottoms so that there is full interaction along the vertical length of both airbags 700, 800.

The various embodiments of the airbag module and cushion disclosed herein offers several advantages. The cushion may provide restraint and cushioning ability while only requiring a minimal amount of sealant to seal the cushion. For example, the cushion may be unsealed for those arrangements that do not require increased pressure retention for lateral restraint. The unsealed cushion reduces the complexity and cost of a typical CSIAB module by reducing amount of sealant required for pressure retention or by eliminating sealant altogether. The cushion provides for a sufficient section modulus, cross-car dimension, and interaction with the passenger seat bottom to both restrain and cushion the driver and passenger. Thus, the cushion eliminates the need for a multitude of tethers and tubular chambering arrangements. However, if necessary, the airbag may include tethers if required by the vehicle environment. The airbag is configured to avoid contacting the driver's shoulder during deployment from the passenger side seatback rail.

For example, testing results have demonstrated that the internal pressure of the cushion during the time period associated with occupant loading in a normal far-side crash is sufficient for protecting the occupants. The high loft of the cushion combined with a relatively high pressure (compared to most curtain airbags) of approximately 100 kPa provides sufficient cushioning for the head of the occupant. The pressure of the airbag cushion during occupant loading (e.g., 40 ms to 110 ms) may range from approximately 80 kPa to approximately 100 kPa. Standard outboard mounted curtain airbags operate at approximately 40-50 kPa and some center mounted far-side airbags inflate to a pressure of 150 kPa or greater during head cushioning time period.

What is claimed is:

1. An airbag module for protecting an occupant of a vehicle seat comprising:
   an inflatable cushion; and
   an inflator for providing inflation gas for the cushion, wherein
   the inflator and the cushion are configured to be mounted to an inboard side of a second vehicle seat located adjacent to the vehicle seat containing the occupant;
   the cushion is configured to inflate into a position inboard of the vehicle seat and the second vehicle seat and includes a forward inflatable chamber fluidly connected to a rearward inflatable chamber;
   the forward inflatable chamber is a larger volume than the rearward inflatable chamber and extends vertically from an area adjacent to a bottom of the vehicle seat to an area adjacent to a top of a headrest of the vehicle seat to protect the head of the occupant in the event of a far-side crash event;
   the rearward inflatable chamber is configured to deploy into a position inboard of the vehicle seat and second vehicle seat; and
   the forward and rearward inflatable chambers are separated by a cleft that opens toward the vehicle seat.

2. The airbag module of claim 1, wherein the forward and rearward chambers are separated by a vertically extending non-inflatable region.

3. The airbag module of claim 2, wherein
   the cushion includes a main panel and a top panel;
   the cushion is formed by folding the main panel along a vertically extending fold line;
   edges of the main panel located on one side of the fold line are connected to edges of the main panel located on the other side of the fold line except for the edge of the main panel located at a top of the cushion; and
   a perimeter edge of the top panel is connected to a top edge of the main panel.

4. The airbag module of claim 3, wherein
   the top panel has a rearward portion overlying the rearward inflatable chamber and a forward portion overlying the forward inflatable chamber; and
   the rearward portion is narrower than the forward portion.

5. The airbag module of claim 1, further comprising an external tether extending from a second vehicle seat side of the cushion around a rear side of the cushion.

6. The airbag module of claim 1, wherein the forward inflatable chamber is configured to inflate into a position that extends downwardly between seat bottoms of the vehicle seat and the second vehicle seat.

7. The airbag module of claim 1, wherein the forward inflatable chamber has a higher loft in a cross vehicle direction than the rearward inflatable chamber.

8. The airbag module of claim 1, wherein
the inflatable cushion comprises a pair of symmetrically shaped panels; and
the panels are connected along perimeters of the panels.

9. The airbag module of claim 1, wherein the cleft is formed by a non-inflated region of the inflatable cushion.

10. The airbag module of claim 1, wherein a top portion of the forward chamber of the inflatable cushion has a substantially cylindrical shape.

11. The airbag module of claim 1, wherein the rearward chamber of the inflatable cushion extends along the interior side of the seat frame and does not extend downward to a location between seat bottoms of the vehicle seats.

12. An airbag module for protecting an occupant of a vehicle seat comprising:
an inflatable cushion; and
an inflator for providing inflation gas for the cushion, the inflator and the cushion being configured to be mounted to an inboard side of a second vehicle seat located adjacent to the vehicle seat containing the occupant, wherein
the cushion is configured to inflate into a position inboard of the vehicle seat and the second vehicle seat, and includes a forward inflatable chamber fluidly connected to a rearward inflatable chamber;
the forward inflatable chamber is a larger volume than the rearward inflatable chamber;
the forward inflatable chamber has a higher loft in a cross vehicle direction than the rearward inflatable chamber;
the forward inflatable chamber extends vertically from an area adjacent to a bottom of the vehicle seat to an area adjacent to a top of a headrest of the vehicle seat to protect the head of the occupant in the event of a far-side crash event; and
the rearward inflatable chamber is configured to deploy into a position inboard of the vehicle seat and the second vehicle seat.

13. The airbag module of claim 12, wherein
the cushion includes a main panel and a top panel;
the cushion is formed by folding the main panel along a vertically extending fold line;
edges of the main panel located on one side of the fold line are connected to edges of the main panel located on the other side of the fold line except for the edge of the main panel located at the top of the cushion; and
a perimeter edge of the top panel is connected to a top edge of the main panel.

14. The airbag module of claim 13, wherein
the forward and rearward chambers are separated by a vertically extending non-inflatable region; and
an upper portion of the cushion is configured to inflate into a configuration that is concave and opens toward the vehicle seat.

15. The airbag module of claim 13, wherein
the forward and rearward inflatable regions are separated by a non-inflated region of the inflatable cushion; and
an upper portion of the cushion is configured to inflate into a configuration that is concave and opens toward the vehicle seat.

16. The airbag module of claim 12, wherein
the inflatable cushion comprises a pair of symmetrically shaped panels; and
the panels are connected along perimeters of the panels.

17. An airbag system for protecting an occupant of a vehicle seat during a far side crash event, the system comprising:
a first airbag module mounted to an inboard side of a first vehicle seat, the first airbag module including a first inflator and a first inflatable cushion, wherein
the first inflatable cushion is configured to inflate into a position inboard of the first vehicle seat and includes a forward inflatable chamber fluidly connected to a rearward inflatable chamber; and
the forward inflatable chamber extends vertically along the side of the first vehicle seat to an area adjacent to a top of a headrest of the first vehicle seat to protect the head of the occupant in the event of a far-side crash event; and
a second airbag module mounted to an inboard side of a second vehicle seat located adjacent to the first vehicle seat, the second airbag module including a second inflator and a second inflatable cushion, wherein
the second inflatable cushion is configured to deploy to a position directly inboard of an interior side of a seat bottom of the second vehicle seat.

18. The system of claim 17, wherein the first inflatable cushion extends vertically downwardly so that a bottom of the first inflatable cushion is positioned at substantially the same height above a seat bottom portion of the first vehicle seat as a top of the second inflatable cushion.

19. The system of claim 17, wherein the first inflatable cushion extends vertically downwardly so that a bottom of the first inflatable cushion overlaps horizontally with a top of the second inflatable cushion.

20. The system of claim 17, wherein the forward inflatable chamber has a higher loft in a cross vehicle direction than the rearward inflatable chamber.

* * * * *